Oct. 13, 1959 F. B. ALLEN Re. 24,718

STORED PRESSURE MEDIUM CONTAINER WITH DISCHARGE CONTROL

Original Filed July 19, 1954 2 Sheets-Sheet 1

INVENTOR.
FRANK B. ALLEN

BY Edward T. Connors
ATTORNEY

STORED PRESSURE MEDIUM CONTAINER WITH DISCHARGE CONTROL

Original Filed July 19, 1954 2 Sheets-Sheet 2

INVENTOR.
FRANK B. ALLEN

BY Edward T. Connors
ATTORNEY

United States Patent Office

Re. 24,718

Reissued Oct. 13, 1959

24,718

STORED PRESSURE MEDIUM CONTAINER WITH DISCHARGE CONTROL

Frank B. Allen, Towaco, N.J., assignor, by mesne assignments, to The Fyr-Fyter Company, Dayton, Ohio, a corporation of Ohio Original No. 2,819,820, dated January 14, 1958, Serial No. 444,312, July 19, 1954. Application for reissue July 31, 1958, Serial No. 755,828

7 Claims. (Cl. 222—5)

Matter enclosed in heavy brackets [ ] appears in the original patent but forms no part of this reissue specification; matter printed in italics indicates the additions made by reissue.

This invention is a continuation-in-part of my application Serial No. 137,847 filed January 10, 1950, now Patent No. 2,684,180, issued July 20, 1954.

The present invention relates to stored pressure medium fluid containers with discharge control such as are used principally for pressurizing fire extinguishers or other devices containing an agent to be expelled by pressure means.

The containers are charged with a compressible fluid at a high pressure and are provided with closure means so that the fluid may be released as desired at a predetermined and controlled rate of discharge. When a container is used in a fire extinguisher it is generally necessary that ample fluid pressure be available to discharge the fire extinguishing agent in less than a minute. Furthermore, it is important that a leak-proof seal be provided for the fluid as the device, in the case of a fire extinguisher, may not be used for a year or more, but the stored fluid always must be available for instant action in the case of a fire. While seat valve closures have been provided for some containers, it has been found desirable in the smaller units to provide a disc seal.

Among the advantages of the disc seal is that when properly made it almost always remains leak-proof. Another advantage is that the disc provides a safety outlet for the release of the fluid in the event the pressure in the container builds up to an unsafe amount such as from a high temperature. Still another advantage is that the stored fluid may be released instantly upon the rupturing of the disc by a puncturing member.

Although the disc acts as a safety valve to relieve an excessive pressure, such as may occur in the container under high temperature conditions, there is a potential hazard in that in an unsecured container the recoil of the escaping fluid may cause the container to rocket about wildly and possibly cause injury or damage. Heretofore, attempts have been made to overcome this difficulty by restricting the outlet passage by making it of small diameter or by placing an orifice disc therein so as to limit the rate of discharge of the fluid and thus limit the recoil action. With such constructions difficulty has been found in some cases in that the charging rate is very slow, thus considerably adding to the charging and recharging costs. Also, with the prior constructions, it is difficult to drain out any water or other material which may have entered the container either before its original charge or during the period while its disc was ruptured, but before recharge, without devalving the container.

The present invention aims to overcome the difficulties and disadvantages of prior devices by providing a container having a limited discharge rate, yet which may be rapidly charged or recharged.

Another object of the invention is to provide a container having a predetermined discharge rate.

The invention may be incorporated in containers adapted to provide a low rate of discharge such as might be used to pressurized a water extinguisher. The low rate of discharge is desirable as the water is practically non-compressible and non-absorbable, thus a high discharge rate of the container would result in excessive pressurizing and stressing of the walls of the extinguisher. Various forms of the invention may be provided to take care of the various requirements.

These objects are accomplished by providing a stored pressure medium container having closure means such as a sealing disc with a fluid flow limiting member in proximity to the sealing disc and removable therewith for ease in replacement. The edge of the fluid flow limiting member may be used as the gasket for the sealing disc. In releasing the fluid from the container a puncturing member is adapted to rupture the sealing disc.

The invention is advantageous in that a "throwaway" unit may be provided at low cost thus rendering it feasible to provide a new fluid flow limiting means with each recharge overcoming any possible difficulty which may arise to the orifice because of corrosion damage or damage from mishandling of the units.

Other objects and advantages of the invention will be apparent from the following description and from the accompanying drawings which show, by way of examples, embodiments of the invention.

Figure 1:
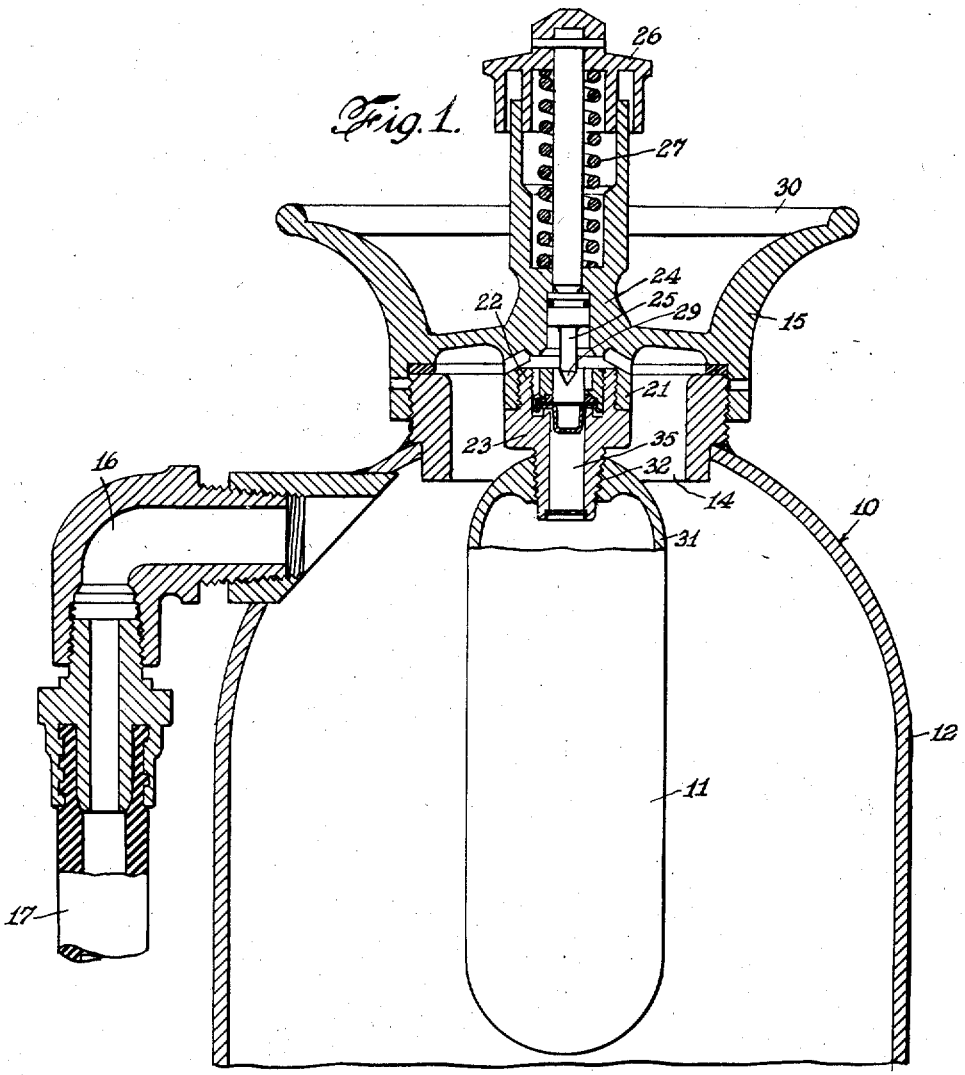
Figure 1 illustrates a fragmentary, vertical sectional view of a water fire extinguisher incorporating a stored pressure medium fluid container made in accordance with the invention.
Figure 3:
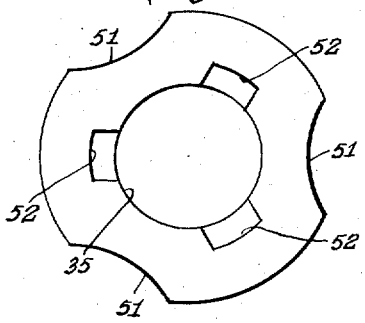
Figure 3 is an enlarged top view of the closure assembly showing the outer filling grooves and the inner grooves for engagement by a tool.

Referring to the drawings, there is shown in Figure 1 a water fire extinguisher 10 pressurized by a stored pressure medium fluid container 11 made in accordance with the invention.

The water fire extinguisher 10 is illustrated to show a use for the stored pressure medium fluid container 11 and includes a standard shell 12 adapted to contain a fire extinguisher fluid which is charged through a filling opening 14 closed by a conventional cap 15. Upon the discharge of the extinguisher the water is pressurized by fluid from the container 11 and expelled through an outlet elbow 16 and a discharge hose 17 through a suitable nozzle (not shown).

Depending from the under surface of the cap 15 is a downwardly extending tubular portion 21, having a threaded inner surface to receive upper threaded end 22 of the closure fitting 23. A guideway 24 is provided for a puncturing member 25 adapted to be moved downwardly under pressure being applied to its actuating cap 26. The puncturing member 25 is normally held in an upward position by a spring 27. The lower end of the puncturing member 25 is pointed as indicated at 29 to facilitate rupturing the closure member of the container as will later appear. The cap 15 is made with a conventional handle ring 30 for the easy transportation of the extinguisher and as a handle for screwing and unscrewing the cap during the filling operation.

The stored pressure medium fluid container or pressure vessel 11, in accordance with the invention, comprises a body or container portion 31, made of any suitable material such as steel to store a fluid medium under high pressure. The upper end of the container body is made with a threaded opening 32 in which is secured the closure fitting 23 having a discharge fluid passage 35 extending therethrough.

Figure 2:
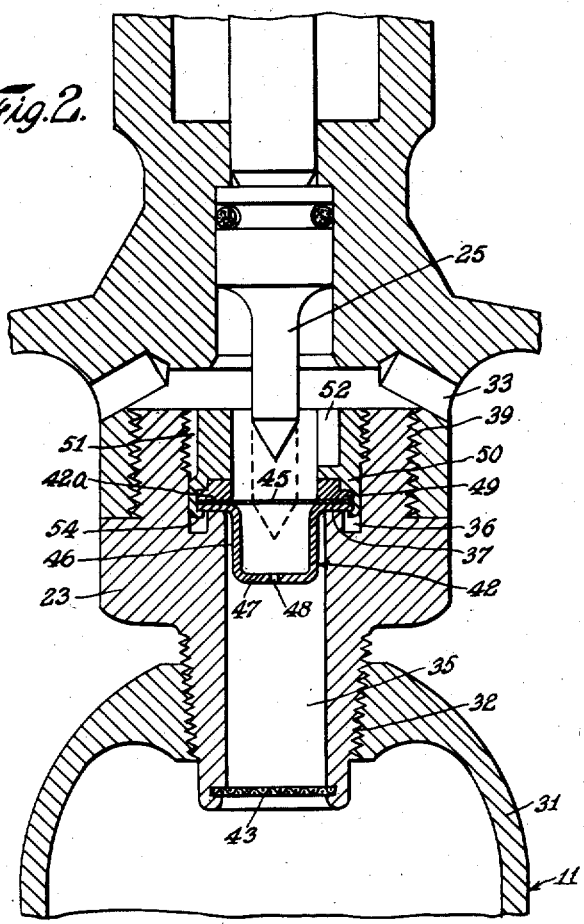
Figure 2 is an enlarged sectional view of a portion of the structure shown in Figure 1 illustrating in dotted lines the puncturing member at the bottom of its downward stroke.

As may be seen in Figure 2, the outer end of the fluid passage 35 is enlarged as indicated at 36 and formed with an upwardly extending sealing seat 37. The outer surface of the upper end of the closure fitting 23 is threaded as indicated at 39, to be received in the downwardly extending tubular portion 21 to hold the cartridge 11 in position with its outlet 36 adjacent to the puncturing member 25.

Within the fluid passage 35 of the closure fitting 23 is a fluid flow limiting member or orifice member 42. Also positioned in the fluid passage 35 and in juxtaposition to the orifice member 42 is a conventional sealing disc 45 adapted to burst under a predetermined pressure within the container 11. Screen 43 is positioned in the discharge passage 35 below the flow limiting member 42 to prevent foreign particles from entering into and possibly obstructing the orifice 48.

Figure 4:
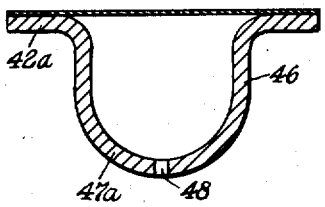
Figure 4 is a vertical sectional view of the fluid passage restricting means in accordance with the invention in which the center portion is extended downwardly to provide clearance space for the puncturing member.
Figure 5:
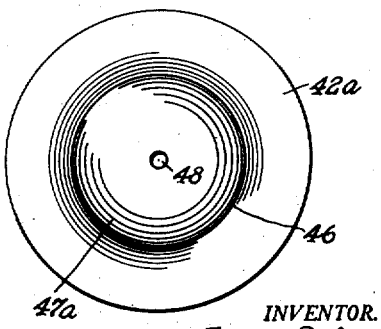
Figure 5 is a bottom view corresponding to Figure 4.

The fluid flow limiting member 42 is preferably made of a material deformable with respect to that of the sealing disc 45 and the sealing seat 37 so that edge 42a of the flow limiting member 42 acts as a sealing gasket to prevent the escape of the stored pressure medium. However, alternatively, a sealing gasket may be used between the flow limiting member 42 and the vlave seat 37. The flow limiting member 42 has a depending cylindrical portion 46 with a closed end 47 of generally square section as may be seen in Figure 2, or an end 47a of hemispherical section may be seen in Figure 4. An orifice 48 is preferably positioned in the center of the closed end.

The orifice member 42 and the closing disc 45 are held in sealing relationship to close the fluid passage 35 against the sealing seat 37 by a washer 49 secured by a ring nut 50. The ring nut 50 is in threaded engagement with the wall of the enlarged portion 36 of the fluid passage and is made with at least one vertically extending filling groove 51 spaced around its circumference. In order to secure the nut in position additional vertically extending grooves 52 are made on the inner surface of the ring nut 50 and adapted to be engaged by a suitable tool which may be turned to tighten the ring nut to provide a good seal. In some constructions the washer 49 might be omitted and the sealing disc held in position directly by the end of the ring nut 50. The construction utilizing the washer is advantageous in providing for the production manufacture of the ring nuts by facilitating the making therein of the inner grooves 52.

The extinguisher 10 is actuated by inverting it and striking its cap 26 against a surface to move the puncturing member 25 inwardly so that its tip 29 ruptures the sealing disc 45 to release the stored fluid pressure medium for expulsion of the fire extinguishing fluid.

It should be noted that the fluid flow limiting member 42 is so shaped that its lower portion 47 is positioned below the lower point of travel of the tip 29 of the puncturing member 25 so that cutting of the flow limiting member 42 will not occur and to allow a clearance space for the lips torn in cutting the sealing disc 45. It also should be noted that in the unoperated position the puncturing tip 29 is spaced from the sealing disc 45 so that there is no chance of weakening or accidental rupture of the sealing disc under conditions of vibration or jarring.

By reason of the incompressibility of the water, and for all practical purposes, the non-solubility therein of the stored fluid pressure medium, it is important that the pressure medium be released at a slow rate through the orifice 48 otherwise the shell 12 would be pressurized to an extent which might cause severe stressing of the walls thereof. Furthermore, without the orifice member an excessive pressure would result in the production of an excessively strong stream of extinguishing fluid at the start which would lessen during the period of effective discharge producing an unsatisfactory result.

In the event the stored pressure medium fluid container 11 is subjected to excessive temperatures such as might result in the case of fire resulting in a terrific increase in its internal pressure, the sealing disc 45 is adapted to rupture at a predetermined pressure below the bursting pressure of the walls of the container 11. However, by reason of the restriction of the orifice 48 of the fluid flow limiting member 42, the discharge rate of the container 11 will be at a predetermined safe rate so that the recoil will not be sufficient to cause the container to rocket and possibly cause damage to persons or property.

In order to facilitate the assembly of a container in accordance with the invention, a unitary pre-assembled unit may be made of the ring nut 50, the washer 49, the sealing disc 45, and the fluid passage restricting means or orifice member 42. In this case, the lower end of the ring nut 50 should be made extended to receive the parts which are then secured in position by spinning in the end as indicated at 54.

In refilling the container 11 it is preferred that a new unitary assembly be used each time in order to assure that the orifice member will be free from dirt, corrosion or the like. The container is refilled by connecting it to a source of fluid pressure with the ring nut 50 loosened. A filling passage is thus provided through the vertically extending filling grooves 51 across the sealing seat 37 into the interior of the container. The ring nut 50 is then tightened to seal the container.

It is thus apparent that the present invention provides a stored fluid pressure medium container overcoming the difficulties and disadvantages of prior devices by providing a container having a limited discharge rate which may be readily charged or recharged.

While the invention has been described and illustrated with reference to specific embodiments thereof, it will be understood that other embodiments may be resorted to without departing from the invention. For example, while the orifice has been described and illustrated as being the center of the fluid flow restricting member it is obvious that it may be located in any part thereof providing a fluid flow. Furthermore, while the invention has been illustrated and described as applicable to a container having a sealing disc closure member, it is apparent that the construction also might be applied to containers having a seat type closure valve utilizing the herein described construction to provide a limited discharge rate to avoid recoil difficulties. Therefore, the form of the invention set out above should be considered as illustrative and not as limiting the scope of the following claims.

I claim:

1. A readily chargeable stored high pressure medium container for use with a separable discharge device including a reciprocable puncturing member, the puncturing member having a predetermined length of stroke and normally maintained in an upward position away from contact with the container, outlet means for the container forming a passage into the container, an outwardly turned sealing seat about the passage, a closure assembly for the outlet means including an axially slotted sealing disc nut threadedly engaged in the closure assembly, a sealing disc at least of a strength to hold the normal pressure in the container and rupturable by a puncturing member, a flow limiting member having an orifice therein and of a strength to hold the pressure in the container while the container is being discharged through the orifice, means spacing the portions of the sealing disc and flow limiting member along the center line of the puncturing member a distance greater than the length of travel of the puncturing member so that upon a stroke of the puncturing member the flow limiting member is free from contact with the puncturing member, and means securing the sealing disc and the flow limiting member with the sealing disc nut in a unitary assembly, whereby upon the retraction of the sealing disc nut away from the sealing seat an unobstructed filling passage is provided through an axial slot of the sealing disc nut past the seat into the container.

2. A readily chargeable stored high pressure medium container for use with a separable discharge device including a reciprocable puncturing member, the puncturing member having a predetermined length of stroke and normally maintained in an upward position away from contact with the container, outlet means for the container forming a passage into the container, an outwardly turned sealing seat about the passage, a closure assembly for the outlet means including an axially slotted sealing disc nut threadedly engaged in the closure assembly, a sealing disc at least of a strength to hold the normal pressure in the container and rupturable by a puncturing member, a cylindrically walled downwardly depending closed end flow limiting member having an orifice therein and of a strength to hold the pressure in the container while the container is being discharged through the orifice, a flanged top edge for the flow limiting member, the cylindrical wall of the flow limiting member spacing the flow limiting member end from the sealing disc along the center line of the puncturing member a distance greater than the length of travel of the puncturing member so that upon a stroke of the puncturing member the flow limiting member is free from contact with the end of the puncturing member, and means securing the sealing disc and the flow limiting member with the sealing disc nut in a unitary assembly, whereby upon the retraction of the sealing disc nut away from the sealing seat an unobstructed filling passage is provided through an axial slot of the sealing disc nut past the seat into the container.

3. A readily chargeable stored high pressure medium container for use with a separable discharge device including a reciprocable puncturing member, the puncturing member having a predetermined length of stroke and normally maintained in an upward position away from contact with the container, outlet means for the container forming a passage into the container, an outwardly turned sealing seat about the passage, a closure assembly for the outlet means including an axially slotted sealing disc nut threadedly engaged in the closure assembly, a sealing disc at least of a strength to hold the normal pressure in the container and rupturable by a puncturing member, a flow limiting member having an orifice therein and of a strength to hold the pressure in the container while the container is being discharged through the orifice, means spacing the portions of the sealing disc and flow limiting member along the center line of the puncturing member a distance greater than the length of travel of the puncturing member so that upon a stroke of the puncturing member the flow limiting member is free from contact with the puncturing member, and a turned in end for the sealing disc nut securing the sealing disc and the flow limiting member with the sealing disc nut body in a unitary assembly, whereby upon the retraction of the sealing disc nut away from the sealing seat an unobstructed filling passage is provided through an axial slot of the sealing disc nut past the seat into the container.

4. A readily chargeable stored high pressure medium container for use with a separable discharge device including a reciprocable puncturing member, the puncturing member having a predetermined length of stroke and normally maintained in an upward position away from contact with the container, outlet means for the container forming a passage into the container, an outwardly turned sealing seat about the passage, a closure assembly for the outlet means including an axially slotted sealing disc nut threadedly engaged in the closure assembly, a sealing disc at least of a strength to hold the normal pressure in the container and rupturable by a puncturing member, a cylindrically walled downwardly depending closed end flow limiting member having an orifice therein and of a strength to hold the pressure in the container while the container is being discharge through the orifice, a flanged top edge for the flow limiting member, the cylindrical wall of the flow limiting member spacing the flow limiting member end from the sealing disc along the center line of the puncturing member a distance greater than the length of travel of the puncturing member so that upon a stroke of the puncturing member the flow limiting member is free from contact with the end of the puncturing member, and a turned in end for the sealing disc nut securing the sealing disc and the flow limiting member with the sealing disc nut body in a unitary assembly, whereby upon the retraction of the sealing disc nut away from the sealing seat an unobstructed filling passage is provided through an axial slot of the sealing disc nut past the seat into the container.

5. A readily chargeable stored high pressure medium container for use with a separable discharge device including a reciprocable puncturing member, the puncturing member having a predetermined length of stroke and normally maintained in an upward position away from contact with the container, outlet means for the container forming a passage into the container, an outwardly turned sealing seat of a predetermined diameter about the passage, a closure assembly for the outlet means including an axially slotted sealing disc nut threadedly engaged in the closure assembly, means forming a recess in the lower end of the sealing disc nut, a gasket for the recess, a sealing disc at least of a strength to hold the normal pressure in the container and rupturable by a puncturing member, a cylindrically walled downwardly depending closed end flow limiting member having an orifice therein and of a strength to hold the pressure in the container while the container is being discharged through the orifice, a flanged top edge for the flow limiting member, the cylindrical wall of the flow limiting member spacing the flow limiting member end from the sealing disc along the center line of the puncturing member a distance greater than the length of travel of the puncturing member so that upon a stroke of the puncturing member the flow limiting member is free from contact with the end of the puncturing member, and a turned in end for the sealing disc nut of a diameter larger than the diameter of the seat, the turned in end securing the sealing disc between the gasket and the flow limiting member with the sealing disc nut body in a unitary assembly, the flange of the flow limiting member normally adapted to contact the seat in sealing relationship, whereby upon the retraction of the sealing disc nut away from the sealing seat an unobstructed filling passage is provided through an axial slot of the sealing disc nut past the seat into the container.

6. A sub assembly closure for a readily chargeable stored high pressure medium for use with a separable discharge device including a reciprocable puncturing member having a predetermined length of stroke and normally maintained in an upward position away from contact with the container, the closure comprising an axially slotted ring nut with a recess in its lower end, a [gasket] *washer* in the recess, a sealing disc, a cylindrically walled downwardly depending closed end flow limiting member having an orifice therein, a flanged top edge for the cylindrical wall of the flow limiting member, the cylindrical wall of the flow limiting member spacing its end from the sealing disc a greater distance than the length of travel of the puncturing member so that the flow limiting member end is free from contact with the puncturing member at the lower end of its stroke, and a turned in end for the sealing disc nut securing the sealing disc between the [gasket] *washer* and the flanged top edge of the flow limiting member in a unitary assembly.

*7. A sub assembly closure for the outlet a readily chargeable stored high pressure medium cartridge for use with a separable discharge device including a reciprocable puncturing member having a predetermined length*

*of stroke and normally maintained in an upward position away from contact with the container, the closure comprising an axially slotted ring nut with a threaded outer surface adapted to engage in the outlet of the cartridge, a sealing disc, a cylindrically walled downwardly depending closed end flow limiting member having an open orifice therein, a flanged top edge for the cylindrical wall of the flow limiting member, the cylindrical wall of the flow limiting member spacing its end from the sealing disc a greater distance than the length of travel of the puncturing member so that the flow limiting member end is free from contact with the puncturing member at the lower end of its stroke, and a turned in end for the sealing disc nut securing the sealing disc and the flanged top edge of the flow limiting member in a unitary assembly, whereby upon an upward movement of the slotted ring nut for*

*the purpose of filling said cartridge the flanged top edge of the flow limiting member is moved therewith, thereby providing a clear filling passage through said slotted portion of the ring nut into the cartridge.*

References Cited in the file of this patent or the original patent

UNITED STATES PATENTS

| | | |
|---|---|---|
| 640,207 | Korrodi | Jan. 2, 1900 |
| 1,015,987 | Bijur et al. | June 30, 1912 |
| 2,610,693 | Allen | Sept. 16, 1952 |
| 2,682,967 | Hill | July 6, 1954 |
| 2,741,319 | Mickelsen | Apr. 10, 1956 |

FOREIGN PATENTS

| | | |
|---|---|---|
| 583,437 | France | Oct. 30, 1924 |